A. BAXTER.
WHEEL GEAR FOR CARRIAGES.
No. 102,079. Patented Apr. 19, 1870.
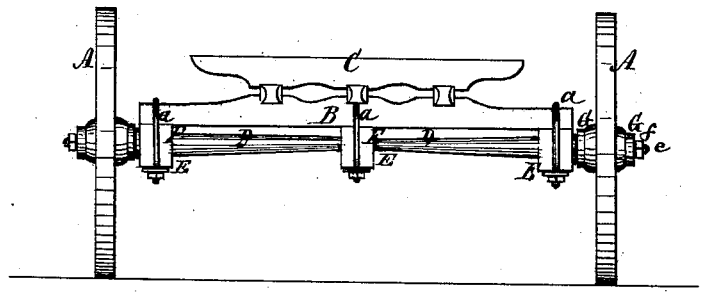
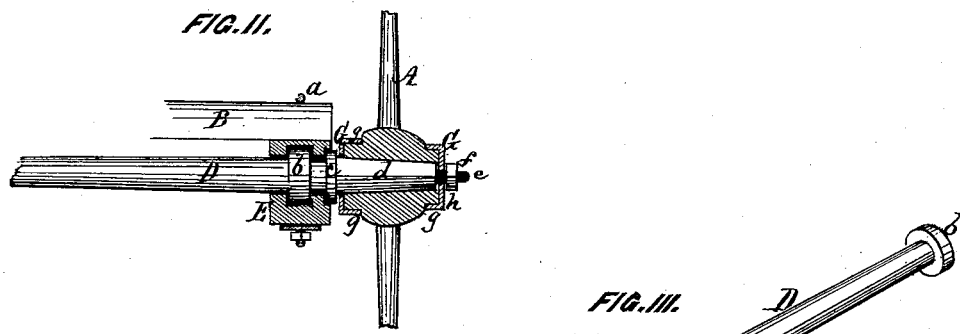
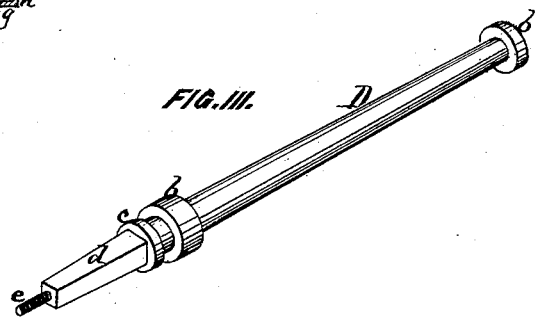
Witnesses.
Inventor.
Albert Baxter,
By J. Fraser & Co.
attys.

UNITED STATES PATENT OFFICE.

ALBERT BAXTER, OF HOWARD, NEW YORK.

IMPROVEMENT IN WHEEL-GEARS FOR CARRIAGES.

Specification forming part of Letters Patent No. 102,079, dated April 19, 1870.

*To all whom it may concern:*

Be it known that I, ALBERT BAXTER, of Howard, in the county of Steuben and State of New York, have invented a certain new and useful Improvement in Wheel-Gears for Carriages, Wagons, &c., of which the following is a specification.

This invention consists in the connection of the wheels with the axles, as hereinafter described.

In the drawings, Figure 1 is a rear elevation of a wagon with my improvement; Fig. 2, a section through the wheel and the box of one axle; Fig. 3, a perspective view of one of the axles detached.

A A are the wheels; B, the cross-block, and C the bolster.

D D are short half-axles having their bearings in boxes E E E, secured fast to the cross-block by clips *a a a*.

The wheels are made fast and stationary to the axles, each wheel and its axle revolving together instead of the wheels turning independently upon the journals of the axle, in the usual manner. The axles have each two collars, *b b*, which rest in the boxes E E, and serve to keep the axles in place against lateral action. The axles are also formed each with an outer collar, *c*, and with a bearing end, *d*, similar to the ordinary journal of fixed axles, except that instead of being round, to allow the wheel to turn thereon, it is preferably made square in cross-section, and a little tapering, as shown, to secure the wheel fast thereto. At the extremity is a screw-tap, *e*, which receives a nut, *f*, to clamp the wheel in place.

The hub of each wheel has two clamp-heads, G G, with annular rims or flanges *g g*, which embrace the ends of the hub and with closed faces *h h*, the inner one with a square eye, to receive the base of the axle-journal, and the outer a round hole, to receive the tap *e*. This construction is clearly shown in Fig. 2.

I am aware that half-axles have been used in a somewhat similar manner on railroad-cars to facilitate turning curves. I do not claim their application, broadly; but my invention consists in so arranging and connecting the wheels with the axles, as described, that the wheels may easily be applied and removed without removing the axles themselves. This is indespensable in common road-carriages, but not in railroad-cars, as in such the wheels are a fixture with the axle, and never removed except when broken or defective. I accomplish the desired result by simply making square or equivalently-formed journals on the axles, and clamping the hub of the wheel fast in place between a collar and a tightening-nut.

An essential feature combined with the square-axle journals is the employment of the two clamp-heads G G, which receive the pressure of the clamping action, thereby preventing defacement, while at the same time they overlap and clasp the hub and prevent any splitting or crushing out under the leverage to which the hub is subject. This connection of the hub with the axle enables the wheel to be removed with the same facility as in common carriages, while at the same time it makes the wheel a fixture with the axle, an effect, I believe, never before produced in common road-wagons and carriages.

Another feature of novelty is the union of the cross-block, the boxes, and the axles by the single clip *a*, applied to each, and encircling all the parts. This construction insures a simple uniting of the parts, and a ready separation.

Clips are common in carriages, but not combined in the manner above described.

I disclaim, simply and broadly, the use of half-axles, each revolving separately, as I am aware they are old.

I also disclaim, simply and broadly, metallic clasps, as I am aware they have before been used in connection with a divided hub to clamp the spokes in place. Such is not the equivalent of my invention.

What I claim, and desire to secure by Letters Patent, is—

1. The connection of the wheels with the axles by means of the collars *c* and *b* and box E, square or otherwise equivalently-formed journals *d*, screws and nuts *e f*, and the encircling clamp-heads G G, the whole arranged as described, and operating in the manner and for the purpose specified.

2. In combination with the above, the single clip *a*, embracing the cross-block B, box E, and axle D, as herein described.

In witness whereof I have hereunto signed my name in the presence of two subscribing witnesses.

ALBERT BAXTER.

Witnesses:
R. F. OSGOOD,
GEO. W. MIATT.